(12) United States Patent
Benhanokh et al.

(10) Patent No.: US 10,970,210 B2
(45) Date of Patent: Apr. 6, 2021

(54) MANAGING DATA STORAGE DEVICES FOR SPONTANEOUS DE-STAGING OF CACHE

(71) Applicant: EMC IP Holding Company LLC, Hopkinton, MA (US)

(72) Inventors: Gabi Benhanokh, Tel-Aviv (IL); Andrew L. Chanler, Berlin, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/398,602

(22) Filed: Apr. 30, 2019

(65) Prior Publication Data

US 2020/0349073 A1    Nov. 5, 2020

(51) Int. Cl.
*G06F 12/0804*    (2016.01)
*G06F 9/50*    (2006.01)

(52) U.S. Cl.
CPC ........ *G06F 12/0804* (2013.01); *G06F 9/5016* (2013.01); *G06F 2212/1008* (2013.01)

(58) Field of Classification Search
CPC .............. G06F 9/5016; G06F 12/0804; G06F 2212/1008
See application file for complete search history.

(56) References Cited

U.S. PATENT DOCUMENTS

| | | | |
|---|---|---|---|
| 5,551,003 A * | 8/1996 | Mattson ................ | G06F 3/0601 711/112 |
| 7,062,675 B1 * | 6/2006 | Kemeny ............. | G06F 11/1441 711/135 |
| 9,229,870 B1 * | 1/2016 | Kumar ................ | G06F 12/0804 |
| 10,289,550 B1 | 5/2019 | Gaasbeck | |
| 2008/0195807 A1 * | 8/2008 | Kubo .................... | G06F 12/126 711/114 |
| 2012/0036309 A1 * | 2/2012 | Dillow ................. | G06F 11/108 711/103 |
| 2012/0066435 A1 | 3/2012 | Colgrove et al. | |
| 2017/0075610 A1 * | 3/2017 | Choi .................... | G06F 1/3275 |
| 2018/0189186 A1 | 7/2018 | Chhabra | |

OTHER PUBLICATIONS

U.S. Appl. No. 16/530,065, filed Aug. 2, 2019, Benhanokh, et al.
U.S. Appl. No. 16/398,602, filed Apr. 30, 2019, Benhanokh, et al.

* cited by examiner

*Primary Examiner* — Larry T MacKall
(74) *Attorney, Agent, or Firm* — Muirhead and Saturnelli, LLC (57) ABSTRACT

Physical storage devices may be managed for spontaneous de-staging from a cache, for example, by determining a background task threshold (UBTT), and controlling one or more physical storage devices to use the UBTT instead of the VBTT in determining when to enter background task mode. The determined UBTT may be less than the VBTT, which may cause the physical storage device to enter into background task mode earlier, which means that background tasks like garbage collection and write leveling may be performed more frequently. An ability to turn on and turn off management of physical storage devices for spontaneous de-staging of a cache may be provided. It may be desirable to turn off physical storage device management for spontaneous de-staging, for example, during peak workload hours, to prevent physical storage devices from entering into background task mode more frequently during certain times.

20 Claims, 4 Drawing Sheets

MANAGING DATA STORAGE DEVICES FOR SPONTANEOUS DE-STAGING OF CACHE

BACKGROUND

Technical Field

This application generally relates to data storage systems, and more particularly to managing physical storage device to de-stage cache.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

In some embodiments of the invention, for a data storage system including a plurality of physical storage devices and a cache for temporarily storing data corresponding to the plurality of physical storage devices, a method is performed. The method includes determining a cumulative amount of storage space to be available on the plurality of physical storage devices in case of a spontaneous de-staging of the cache, for one or more of the plurality of physical storage devices, determining an apportioned amount of the cumulative amount for the respective physical storage device to have available for storing data in case of a spontaneous de-staging of the cache, and, for each of the one or more physical storage devices, controlling a threshold amount of storage space to be consumed on the physical storage space before the physical storage device enters into a background task mode, the threshold amount based at least in part on the respective determined apportioned amount for the physical device. The method may further include selecting a number of the plurality of physical storage devices to receive de-staged data from the cache in case of a spontaneous de-staging of the cache, where, for each of the one or more physical storage devices, the apportioned amount may be determined at least in part based on the selected number of physical storage devices. For each of the one or more physical storage devices, the apportioned amount may be determined based at least in part on a predetermined amount of time for all of the data in the cache to be de-staged during a spontaneous de-staging of the cache. The determined cumulative amount may be based on a current amount of data stored in the cache that has changed since a last de-staging of the cache. The method may further include each of one or more of the plurality of physical storage devices indicating, on one or more occasions, a remaining storage capacity on the physical storage device before the threshold amount of storage space is reached for the physical storage device. The method may further include providing a parameter that specifies whether to control the threshold amount in relation to a spontaneous de-staging of the cache, receiving a value for the parameter indicating to not control the threshold amount, and, for each of the one or more physical storage devices, refraining from controlling the threshold amount based on the value of the parameter. The steps of determining the cumulative amount of storage space, determining the apportioned amount of the cumulative amount for each respective physical storage device, and controlling the threshold amount of storage space for each respective physical storage device may be repeated a plurality of times.

In some embodiments, a data storage system includes a plurality of physical storage devices, a cache for temporarily storing data corresponding to the plurality of physical storage devices, one or more processors and memory including code stored thereon that, when executed, performs the above-described method.

In some embodiments, one or more computer-readable media, for example, non-transitory computer-readable media, are provided having software stored thereon, the software including executable code that performs the above-described method.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

As described in more detail herein, storage systems may include a global memory (GM) shared by components of the storage system, for example, directors. The GM may include a cache to temporarily store data that is stored (or that is to be stored—e.g., as part of a write operation) on the physical storage devices of the storage system. Components of the storage system typically can access data in cache faster (typically much faster) than data stored on a physical storage device (sometimes referred to as "PSD" in the drawings). As described in more detail herein, in a typical storage system, data written to the storage system from a host is first stored in the cache, and then de-staged to the one or more target physical storage devices after some time. Further, data may be prefetched for read operations and stored in cache. After some period of time, a portion of data stored in cache is evicted, for example, in accordance with an eviction policy such as, for example, a least recently used (LRU) policy.

In some storage systems, for a write operation, the storage system acknowledges to the host system that the write operation is complete before the write operation has been completed, for example, while the data of the write operation is stored in cache but has not yet been de-staged to one or more physical storage devices (i.e., "flushed to disk"). Data that is stored in cache as part of a write operation and has not yet been de-staged may be referred to as "dirty data." Thus, if the storage system unexpectedly fails, either due to an error, power failure or otherwise, and there is dirty data in the cache, a host system may be out of sync with the storage system with respect to the data at the time of the failure. There are many known techniques for re-synchronizing data between a storage system and a host, and between storage systems of distributed storage system, when recovering from a failure, including use of journaling and other techniques.

As a further failsafe against a power failure, some storage systems are configured to perform a spontaneous de-staging of the contents (at least the dirty data) of the cache to physical storage devices; i.e., a de-staging not scheduled and/or in accordance with standard cache de-staging procedure). That is, some storage systems are configured with a backup power supply (e.g. a battery) that can provide power for a limited amount of time to allow contents of the cache to be de-staged to physical storage devices before the backup power itself fails. When power is restored, the de-staged data then can be copied back into cache as part of the recovery process.

To be able to adequately perform spontaneous de-staging (sometimes referenced in the figures as "SDS"), the storage system needs to: a) have enough cumulative storage capacity among the physical storage devices to store any dirty data in the cache at the time of power loss; and b) be able to de-stage all of the dirty data within the amount of time that backup power can be maintained. With respect to the latter, depending on the size of the cache and the amount of backup (e.g., battery) power, there may be relatively little time (e.g., seconds or tens of seconds) to de-stage significant amounts e.g., gigabytes or even terabytes) of data from the cache. To this end, the storage system may monitor the amount of dirty data in the cache and ensure that there is enough cumulative storage space available to de-stage the dirty data in an event of a spontaneous de-staging. For example, the storage system may monitor the amount of storage capacity on eligible physical storage devices and ensure there is enough storage space cumulatively in the event of a spontaneous de-staging, and take remedial action (e.g., add physical storage devices, move data to another storage system, archive data, adjust cache parameters, etc.) if necessary.

Some types of physical storage devices, for example, flash drives, have one or more background tasks that are performed from time to time. For example, due to the manner in which flash drives organize data stored thereon within sections of storage called pages ("flash pages"), the pages often become fragmented, requiring that the flash drive be defragmented—i.e., requiring that garbage collection be performed on the flash drive. Another background task is wear leveling (aka "write leveling"). Flash drives wear down over time. That is, a given unit of storage on the flash drive has a limit to the number of writes that can be made thereto before it fails. Write leveling spreads the distribution of writes across the address space of the flash drive to avoid one or more storage units wearing down prematurely because of having an inordinately high number of writes thereto compared to other storage units.

Both garbage collection (GC) and write leveling (WL), as well as perhaps other background tasks, require use of additional storage space on the flash drive to be performed. For this reason, physical storage devices may be configured with one or more storage thresholds (e.g., 75%, 80%, 85%, etc. of storage capacity) for which background tasks are performed after being reached. These thresholds are often referred to herein as vendor-defined background task thresholds (VBTTs). When a VBTT is reached on a flash drive, the flash drive may enter into a background task mode during which one or more background tasks are performed. During background task mode, the performance of the flash drive is degraded. The phenomenon of a flash drive fluctuating between performing normally and in a degraded fashion during background task mode may be referred to herein as jitter.

If a flash drive goes into background task mode immediately prior to or during data being de-staged to it during spontaneous de-staging, the spontaneous de-staging may not complete before power fails, either because not enough cumulative storage capacity remains among the remaining physical storage devices available for spontaneous de-staging or because of the delay caused in reconfiguring the spontaneous de-staging process to accommodate for loss of the flash drive's storage resources.

What is desired is a way to manage physical storage devices, in particular flash drives, so as to avoid, or at least reduce the likelihood of, physical storage devices entering into background task mode during or immediately preceding a spontaneous de-staging event.

Described herein are systems and techniques for managing physical storage devices for spontaneous de-staging a cache, for example, by determining a background task threshold referred to herein as a user-defined background task threshold (UBTT), and controlling one or more physical storage devices to use the UBTT instead of the VBTT in determining when to enter background task mode. The determined UBTT may be less than the VBTT, which may cause the physical storage device to enter into background task mode earlier, which means that background tasks like garbage collection and write leveling may be performed more frequently. As a result, more physical storage devices may have more capacity available for spontaneous de-staging. Further, because background tasks are performed more frequently, there is less storage space and data on which to perform the backgrounds tasks, which may result in the background tasks being performed faster. That is, even though a lower background task threshold may result in entering background task mode more frequently, this greater frequency may be offset by each background task mode lasting a shorter amount of time.

In some embodiments, the ability to turn on and turn off management of physical storage devices for spontaneous de-staging, including application of a UBTT, is provided. It may be desirable to turn off physical storage device management for spontaneous de-staging, for example, during peak workload hours, to prevent physical storage devices from entering into background task mode more frequently during certain times, which may degrade performance. In such embodiments, users (e.g., system administrators) are provided the flexibility of deciding when to manage physical storage devices for spontaneous de-staging.

Illustrative embodiments of the invention will now be described in more detail in relation to the figures.

Figure 1:
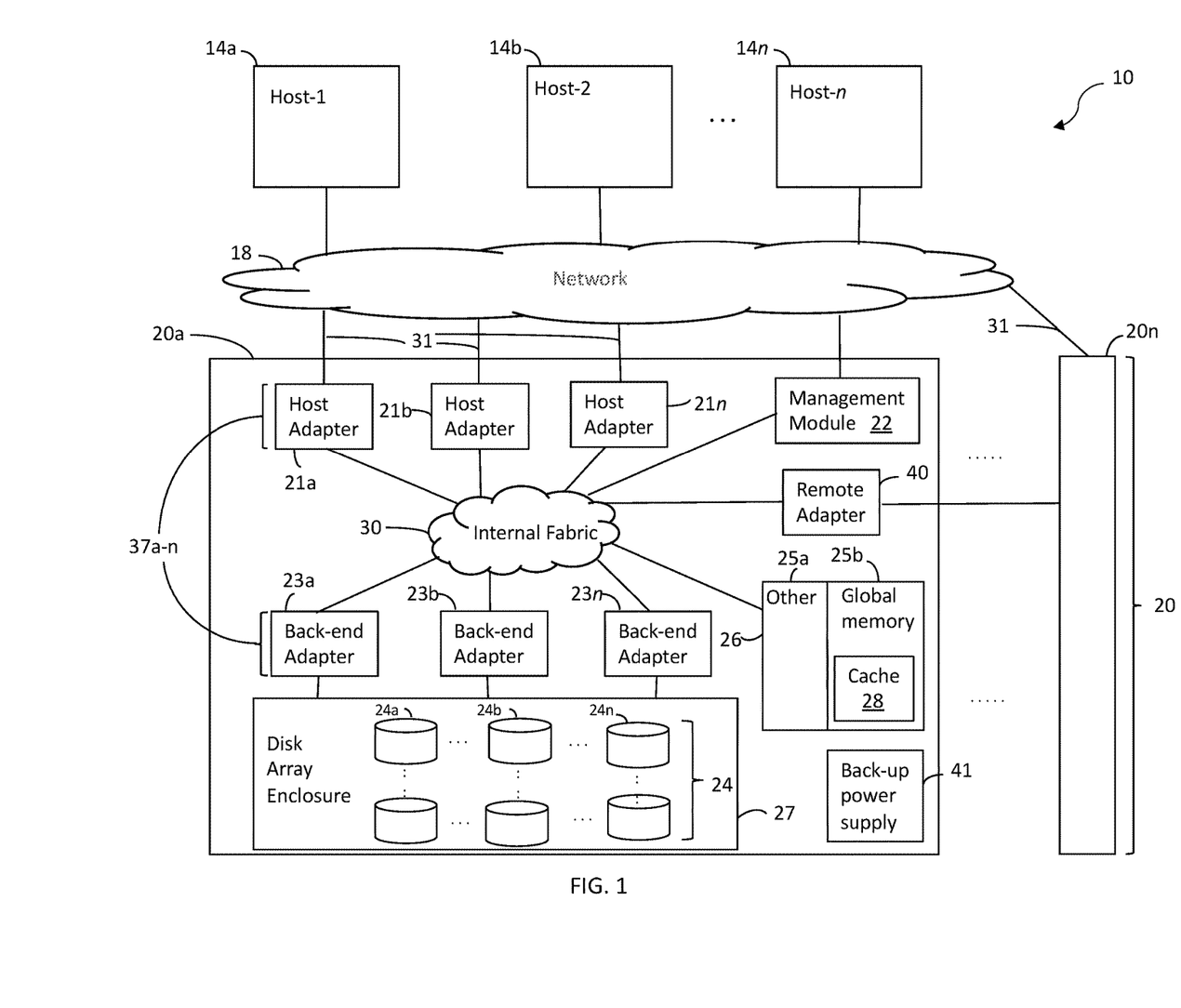
FIG. 1 is a block diagram illustrating an example of a data storage network, according to embodiments of the invention.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications between one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be a Fibre Channel (FC) adapter if FC is the technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems, such as between two of the same or different types of storage systems, and/or may be implemented using a director.

Storage system 20a also may include a management module 22, which may be configured (e.g., dedicated) to performing storage management functions or services such, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, a sending one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g. a battery) that can provide power to the storage system for a limited amount of time to allow after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Any of storage systems 20a-n, or one or more components thereof, described in relation to FIGS. 1-2 may be implemented using one or more Symmetrix®, VMAX®, VMAX3® or PowerMax™ systems (hereinafter referred to generally as PowerMax storage systems) made available from Dell EMC.

Host systems 14a-n may provide data and access control information to storage systems 20a-n over a plurality of I/O paths defined between the host systems and storage systems, for example, including host system components, storage system components, and networks components (e.g., of network 18), and the storage systems also may provide data to the host systems across the I/O paths. In the embodiment of FIG. 1, the host systems do not address the physical storage devices (e.g., disk drives or flash drives) 24 of the storage systems directly, but rather access to data may be provided to one or more host systems from what the host systems view as a plurality of logical storage devices (or simply "logical devices"), including, for example, LUNs, namespaces, thin devices, groups of logical devices (e.g., storage groups), and other types of logical devices. The logical devices may or may not correspond to the actual physical storage devices. For example, one or more logical devices may map to a single physical storage device; that is, the logical address space of the one or more logical device may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on logical device(s) mapped thereto. The unqualified term "storage device" as used herein means a logical device or physical storage device.

In an embodiment in accordance with techniques herein, the storage system as described may be characterized as having one or more logical mapping layers in which a logical device of the storage system is exposed to the host whereby the logical device is mapped by such mapping layers of the storage system to one or more physical devices. Additionally, the host also may have one or more additional mapping layers so that, for example, a host-side logical device or volume may be mapped to one or more storage system logical devices as presented to the host.

Any of a variety of data structures may be used to process I/O on storage system 20a, including data structures to manage the mapping of logical devices and locations thereon to physical storage devices and locations thereon. Such data structures may be stored in any of memory 26, including GM 25b and memory 25a, GM segment 220a-n and/or board local segments 22a-n. Thus, storage system 20a, and storage system 620a described in more detail elsewhere herein, may include memory elements (e.g. cache) that hold data stored on physical storage devices or that is currently held ("staged") and will be stored ("de-staged") to physical storage devices, and memory elements that store MD (e.g., any of the MD described herein) associated with such data. Illustrative examples of data structures for holding such MD will now be described.

Figure 2:
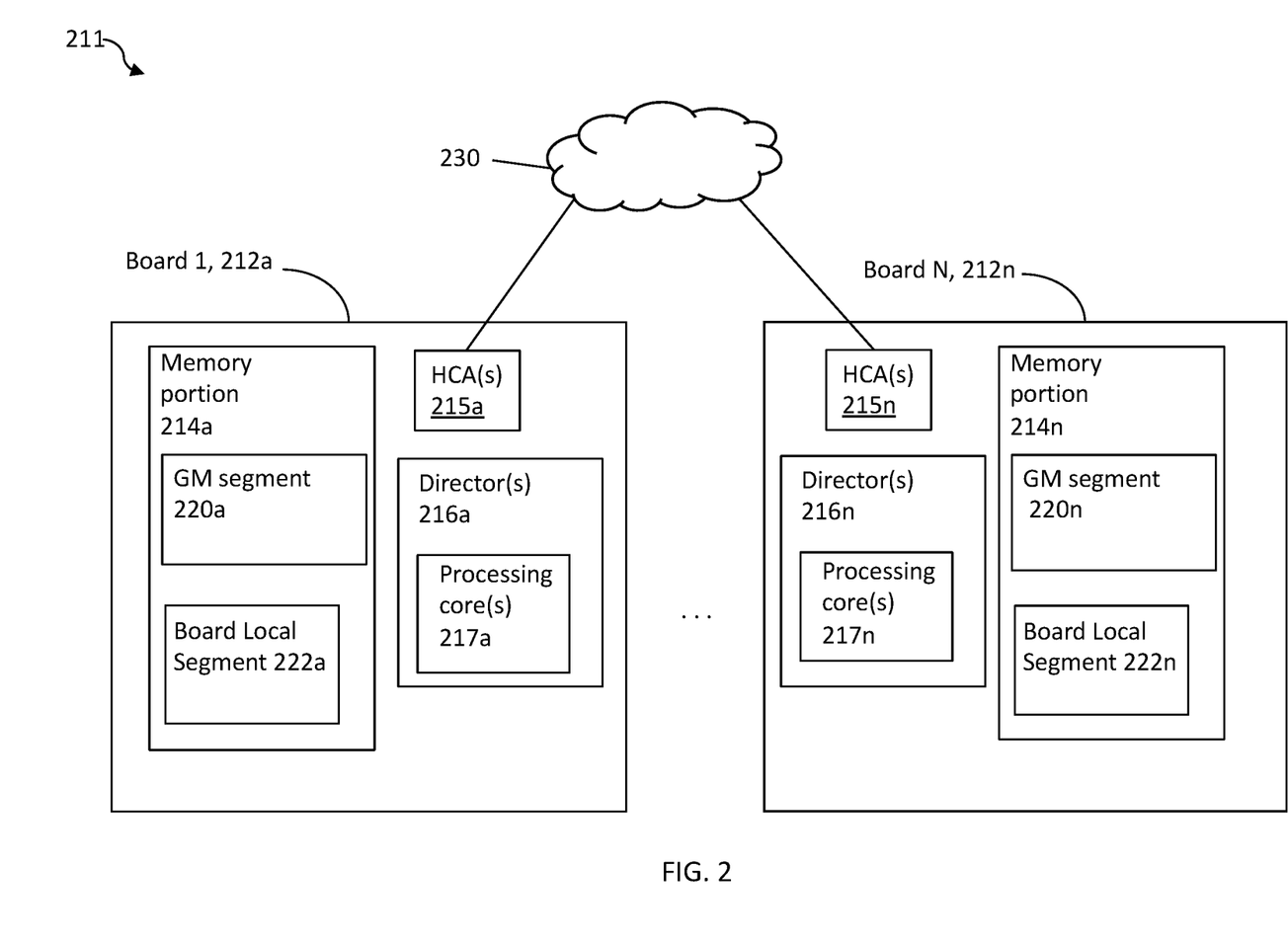
FIG. 2 is a block diagram illustrating an example of a storage system including multiple circuit boards, according to embodiments of the invention.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, MD, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various MD and/or structures, and other information, as described in more detail elsewhere herein. Consistent with discussion herein, the data cache, having cache slots allocated from GM segments 220a-n, may be used to store I/O data (e.g., for servicing read and write operations).

Figure 3:
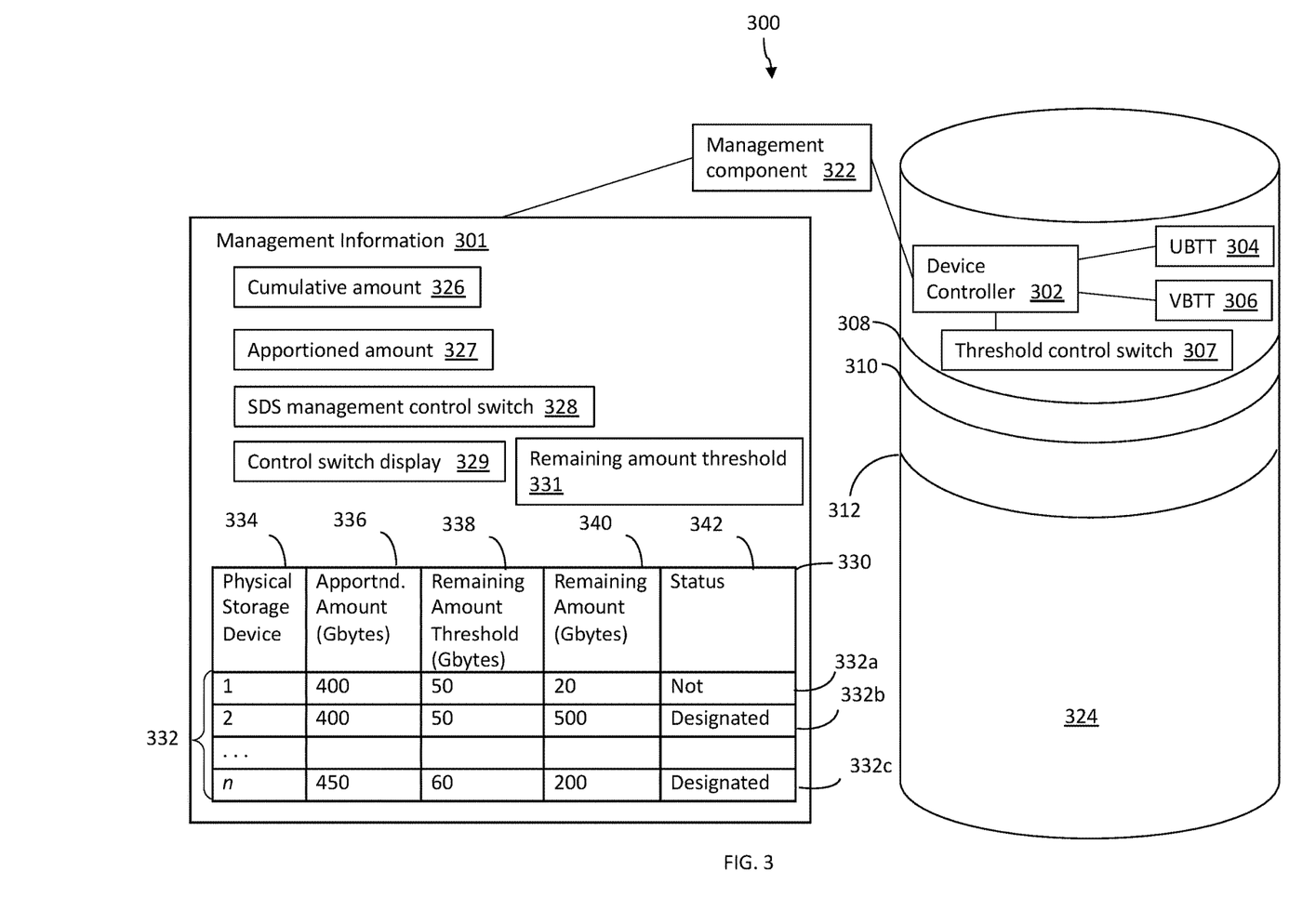
FIG. 3 is a block diagram illustrating an example of a system for managing physical storage devices for spontaneous de-staging of cache, according to embodiments of the invention.

FIG. 3 is a block diagram illustrating an example of a system 300 for managing physical storage devices for spontaneous de-staging of cache, according to embodiments of the invention. Other embodiments of a system for managing physical storage devices for spontaneous de-staging of cache, for example, variations of system 300, are possible and intended to fall within the scope of the invention. System 300 may include any of: management information 301, management component 322, physical storage device 324, other components; and/or any suitable combination of the foregoing, and may be part of a storage system, for example, storage system 20a described in relation to FIG. 1.

Management information may include any of: cumulative amount value 326, apportioned amount value 327, SDS management control switch value 328, control switch display value 329, remaining amount threshold 331; physical storage device management table 330, other information, and any suitable combination of the foregoing. Cumulative amount value 326 may specify a cumulative amount of storage space to be available on the plurality of physical storage devices (including storage device 324) of the storage system in case of a spontaneous de-staging of a cache. The determination of cumulative amount value 326 is described in more detail elsewhere herein. Apportioned amount value 327 may specify an apportioned amount of the cumulative amount for one or more of the plurality of physical storage devices to have available for storing data in case of a spontaneous de-staging of the cache. Determining the apportioned amount is described in more detail elsewhere herein. In some embodiments, different apportioned amounts may be determined for different physical storage devices, and may be specified in physical storage device management table 330.

SDS management control switch value 328 may specify a value indicating whether management of physical storage devices for spontaneous de-staging is turned on, i.e., whether apportioned amount 327 (or apportioned amounts 336) will be applied to physical storage devices, the determination and effect of which is described in more detail elsewhere herein. Control switch display value 329 may specify whether the value of SDS management control switch value 328 may be displayed, for example, using a graphical user interface that is in communication with a director 37a-n, management module 22 or other component of storage system 20a.

The remaining amount threshold 331 may specify a threshold amount of storage capacity remaining on the physical storage device before reaching the physical storage device's UBTT that needs to be available for the physical storage device to be selected and designated as a spontaneous de-staging participant; i.e., designated to receive de-staged data from cache in case of a spontaneous de-staging of the cache. That is, even though the storage consumption on a physical storage device may not have yet reached the UBTT of the physical storage device, it may not be desirable to select the physical storage device to participate in spontaneous de-staging because of a probability it may enter into background task mode immediately prior to, or during, spontaneous de-staging. In some embodiments, a remaining amount threshold may be determined for each eligible physical storage device individually based on any of a variety of factors, for example, any of those described in relation to determining an apportioned amount of space for a physical storage device, as described in more detail elsewhere herein.

Physical storage device management table 330 may include a plurality of entries 332a-c, each entry representing a physical storage device, including, for example, physical storage device 324. Each entry 332a-n may specify, for the physical storage device represented by the entry: a physical storage device identifier in physical storage device identifier column 334; an apportioned amount of the cumulative amount for the physical storage device to have available for storing data in case of a spontaneous de-staging of the cache in apportioned amount column 336; a remaining amount threshold for the physical storage device in remaining amount threshold column 338; an amount of storage capacity remaining on the physical storage device before the UBTT is reached for the physical storage device in remaining amount column 340; whether the physical storage device is a currently designated participant in spontaneous de-staging in status column 342; and other information (e.g., storage capacity of the physical storage device, UBTT of the physical storage device, VBTT of the physical storage device, type of physical storage device, vendor of the physical storage device, product ID of the physical storage device, performance characteristics of the physical storage device, etc.). In some embodiments, the remaining amount threshold value for a physical storage device may be the same for all physical storage devices, as defined by remaining amount threshold 331, or may be determined for each individual physical storage device.

Management component 322 may be, include, or be included as part of management module 22 and/or one or more directors 37a-n. Management component 322 may be configured to manage one or more physical storage devices, including physical storage device 324, using any of a variety of techniques described herein, including those described in relation to method 400 described in relation to FIG. 4. Management component 322 may utilize management information 301 or portions thereof, and may exchange one or more communications with device controller 302 of physical storage device 324, in managing physical storage device 324 for spontaneous de-staging of cache, for example, as described in more detail elsewhere herein.

It should be appreciated that although only one management component 322 is illustrated, system 300 may include multiple management components (e.g., one or more directors 37a-n and/or one or more management modules 22). It also should be appreciated the management information 301 and management component 322 may be shared by, and under common control of, one or more host systems (e.g., any of host systems 14a-n) or other components of data storage network 10. That is, multiple host systems of other entities may have the ability to access management information 301 and/or management component 322, and modify management information 301 and/or manage spontaneous de-staging of one or more physical storage devices (e.g., physical storage device 324). Known techniques for maintaining the integrity of any shared information or memory that stores such information, for example, atomic operations involving locking memory access, may be used.

Physical storage device 324 may be any of physical storage devices 24 described in relation to FIG. 1. physical storage device 324 may include any of: device controller 302, UBTT value 304, VBTT value 306, threshold control switch value 307; other components or any suitable combination of the foregoing. Device controller 302 may be implemented as a combination of hardware, firmware and/or software, and may have been configured as part of physical storage device 324 by the vendor that produced physical storage device 324. Device controller 302 may be configured to communicate with management components of a storage system, for example, management component 322, e.g., in connection with managing physical storage device 324 for spontaneous de-staging of cache.

VBTT value 306 may specify a value for VBTT 308, and UBTT value 304 may specify a value for UBTT 310. While UBTT 310 is shown as being less than VBTT 308, it should be appreciated that the invention is not so limited, and that UBTT 310 may be the same as or greater than VBTT 308. It should further be appreciated that the value of UBTT may change over time, as described in more detail elsewhere herein. Element 312 illustrates an example of a current amount of storage consumed on the physical storage device 324. With respect to elements 308, 310 and 312, it should be appreciated that an amount of storage is reflected as a distance from a bottom of physical storage device 324 toward the top of physical storage device 324. UBTT value 304 may be determined by device controller 302 based on an apportioned amount value (e.g., 327) received from management component 322 and the storage capacity of physical storage device 324, or UBBT value 304 may have been received from management component 322, which may have determined the UBTT value based on an apportioned amount value (e.g., 327) and the storage capacity of physical storage device 324, for example, as described in more detail elsewhere herein.

Threshold control switch value 307 may specify a value indicating whether UBTT 304 is to be applied (i.e., whether management of physical storage devices for spontaneous de-staging is turned on), or rather whether VBTT 306 should be applied for physical storage device 324, e.g., as it would be under conventional conditions. Threshold control switch value 307 may be a same value as SDS management control switch value 328. Device controller 302 may monitor the current amount of consumption 312 of storage on the physical storage device 324, and report this amount to management component 322, for example, periodically according to a pre-defined schedule and/or in response to an event, for example, a request received from management component or detection of a change in the amount of storage consumption 312.

Device controller 302 may be configured with logic to utilize UBTT value 304, VBTT value 306, threshold control switch value 307 and the monitored amount of storage consumption 312 as part of managing physical storage device 324 for spontaneous de-staging of cache, for example, as described in more detail elsewhere herein.

Figure 4:
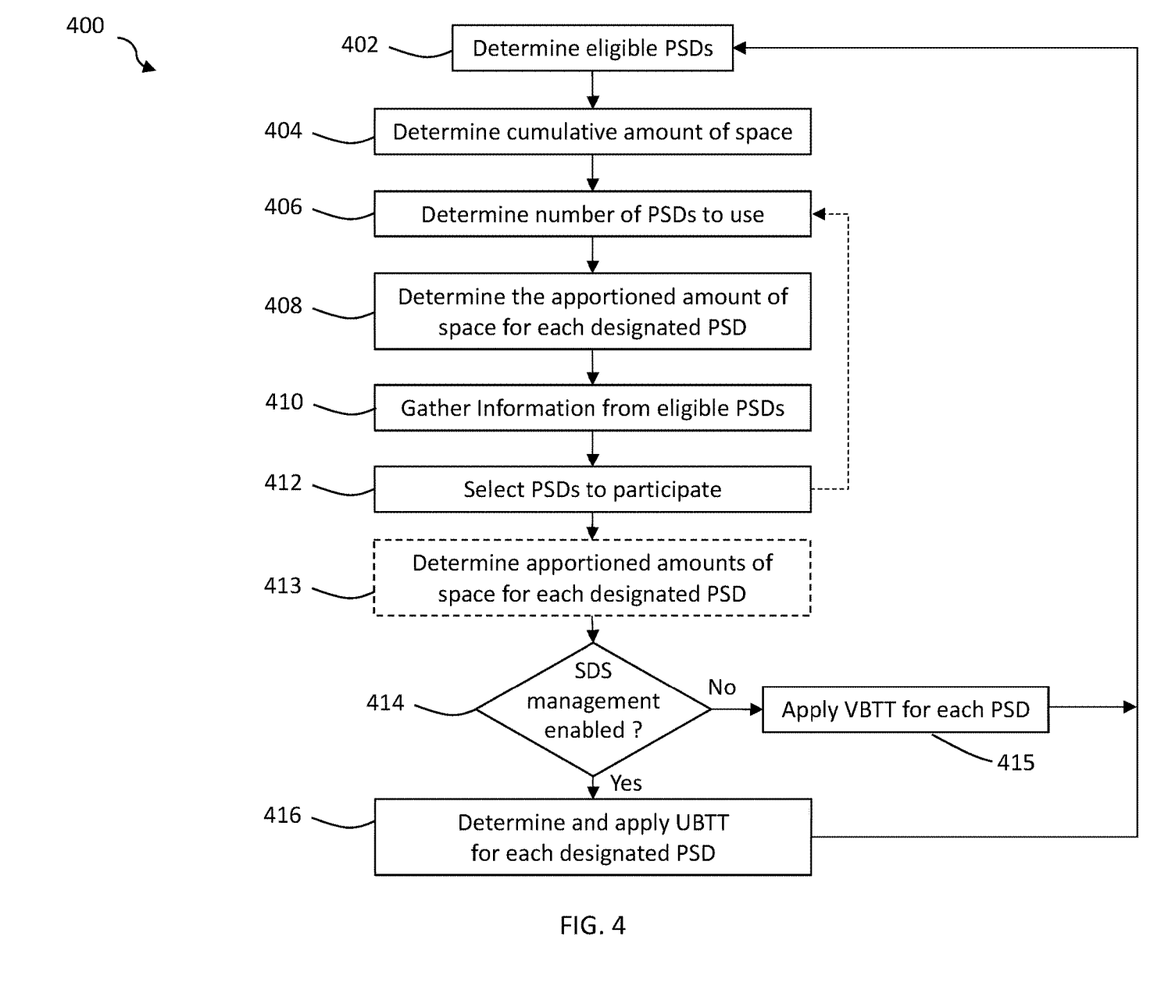
FIG. 4 is a flowchart illustrating an example of a method of managing physical storage devices for spontaneous de-staging of cache, according to embodiments of the invention.

FIG. 4 is a flowchart illustrating an example of a method 400 of managing data storage devices for spontaneous de-staging of cache, according to embodiments of the invention. Other embodiments of a method of managing data storage devices for spontaneous de-staging of cache, for example, variations of method 400, are possible and intended to fall within the scope of the invention. Method 400 may be performed by one or more components of storage system 20a, including system 300, for example, by one or more management components 322 (e.g., directors 37a-n and/or management module 22) in communication with device controller 302.

In step 402, it may be determined which physical storage devices are eligible for participating in spontaneous de-staging. For example, in some embodiments, one or more physical storage devices may be off-line or designated as not being eligible to participate, for example, because the physical storage device is dedicated to a critical workload or function.

In step 404, a cumulative amount of space needed in the event of a spontaneous de-staging of cache may be determined. In some embodiments, the cumulative amount may be set as the size (i.e., storage capacity) of the cache, for example, 2 terabytes (TB), in which case the cumulative amount value may remain static, only changing if the size of the cache changes. In other embodiments, the cumulative amount may be set to a value based on the amount of data stored in the cache or the amount of dirty data stored in the cache, in which cases the cumulative amount value may change relatively frequently and may be considered a dynamic value. In embodiments in which the cumulative amount is a dynamic value, the cumulative amount value may be set conservatively; i.e., set to a value higher than the determined amount of data or dirty data in cache, to ensure that enough storage space is apportioned on the physical storage devices in step 406, which may also accommodate a potential loss of one or more designated participating physical storage devices immediately before or during spontaneous de-staging. The determined cumulative amount may be stored on the storage system, for example, as cumulative amount value 326.

In step 406, the number of physical storage devices to use for a spontaneous de-staging event may be determined, which may be based on any of a plurality of factors including, but not necessarily limited to: the cumulative amount of data determined in step 404, the number of eligible physical storage devices determined in step 402, the amount of time available to perform spontaneous de-staging, the rate at which is it is possible to transfer data from cache to one or more physical storage devices (which may in part be based on performance capabilities of the eligible physical storage devices or other components of the storage system), a desired amount of time in which to perform spontaneous de-staging, a desired amount of physical storage devices to use (i.e., a desired amount of distribution), and other factors. The amount of time available may be set to a value corresponding to an estimation based on the back-up power available, e.g., based on an estimation of the time it will take for the back-up power to be exhausted (i.e., the entirety of the back-up power to be consumed) during a spontaneous de-staging. The amount of time may be set conservatively, to ensure that enough time is afforded to de-stage all of the data or dirty data in cache. In some embodiments, it may be desirable to select as many as possible (e.g., all) of the eligible physical storage devices to participate in the event of a spontaneous de-staging, which may be desirable to accommodate for one or more physical storage devices becoming unavailable immediately prior to or during spontaneous de-staging, in which case it may be possible to use the remaining designated physical storage devices without having to select additional eligible physical storage devices to participate. Further, the greater the number of eligible physical storage devices selected for spontaneous de-staging, the more parallelism may be applied, which may result in faster de-staging.

In step 408, the amount of data to apportion to each physical storage device (to be designated in step 412) may be determined. That is, in some embodiments, the amount of data to be apportioned to individual physical storage devices will be the same for all designated physical storage devices, which may be determined in step 408, whereas in other embodiments, different apportioned amounts may be determined for different physical storage devices. Different amounts may be apportioned to different physical storage devices for any of a variety of reasons, including, for example, the capabilities of the physical storage devices, the current available storage capacity on the physical storage devices, the current use of the physical storage device, the current wear on the physical storage device, etc. In some embodiments, the amount data to apportion is determined by dividing the cumulative amount of space determined in step 404 by the number of physical storage devices to use determined in step 406. For example, if the determined cumulative amount is 1 TB, and the number of physical storage devices determined is 20, the apportioned amount value may be set equal to I TB/20=50 GB. The amount of data to apportion determined in step 408 may be stored as apportioned amount value 327.

In step 410, information may be gathered from any (e.g., all) eligible physical storage devices, including any information described herein as possibly being taken into account in selecting eligible physical storage devices to participate in spontaneous de-staging. Information gathered in step 410 may include, for each physical storage device any of: the storage capacity of the physical storage device, the current available storage capacity on the physical storage devices, the remaining amount of storage capacity on the physical storage device before the UBTT of the physical storage device is reached, a previously defined UBTT for the physical storage device, the current status of the physical storage device (i.e., whether or not the physical storage device is currently designated as a participant); current use of the physical storage device, the current wear on the physical storage device, the type of physical storage device, the vendor (i.e., manufacturer) of the physical storage device, and other information.

Physical storage device information gathered in step 410 may be stored in physical storage device management table 330. For example, the remaining amount of storage capacity before reaching a UBTT for a physical storage device may be stored in column 340 of the entry 322a-n of table 330 corresponding to the physical storage device.

In step 412, one or more eligible physical storage devices may be selected (i.e., designated) to participate in spontaneous de-staging of a cache (such selected physical storage devices sometimes referred to herein as "designated" physical storage devices), for example, based on an analysis of information gathered in step 410. Step 412 may include, for each eligible physical storage device, comparing the remaining amount of storage available on the physical storage device (e.g., as specified in column 340 of table 330) to the remaining amount threshold for the physical storage device (e.g., as specified in column 338 of table 330). In some embodiments, if such remaining amount for the physical storage device is equal to or greater than such threshold amount for the physical storage device, the physical storage device may be selected, and if such remaining amount for the physical storage device is less than such threshold amount for the physical storage device, the physical storage device may not be selected. For example, the physical storage device represented by entry 332a may be not be selected because the remaining amount specified in column 340 is less than the remaining amount threshold specified in column 338. Conversely, the physical storage devices represented by entries 332b and 332c may be selected because the remaining amounts specified in column 340, respectively, are less than the remaining amount thresholds specified in column 338, respectively.

In some embodiments, based on the analysis in step 412, method 400 may return to step 406. For example, it may be determined from the gathered information that there are not enough physical storage devices having the apportioned amount available to satisfy the cumulative amount of space determined in step 404, in which case in step 406 the number of physical storage devices may be decreased, and the apportioned amount increased accordingly in step 408. For example, if the cumulative amount is 1 TB, and the number of physical storage devices to use is changed from 10 to 8, the apportioned amount may change from 100 GB to 125 GB.

In some embodiments, if different apportioned amounts of space are determined for individual physical storage devices, method 400 may include step 413, in which an apportioned amount of space may be determined individually for each designated physical storage device.

After the selection of the designated physical storage devices from among the eligible physical storage devices in step 412 or after step 413 in embodiments including step 413, physical storage device management table may be updated. For example, for each physical storage device: the apportioned amount determined in step 408 or 413 may be stored in column 336; and the status (e.g., "designated" or "not designated") may be updated in column 342. In some embodiments, the status of all eligible physical storage devices may be initialized to "not designated"). It should be appreciated that the status may be expressed in column 342 as a Boolean and/or binary value.

In step 414, it may be determined whether management of physical storage devices for spontaneous de-staging is enabled, for example, by accessing the spontaneous de-staging management control switch value 328. If it determined that physical storage device management for spontaneous de-staging is enabled, then in step 416, for each designated physical storage device, a UBTT for the physical storage device may be determined and applied. A UBTT (e.g., UBTT 310 of physical storage device 324 specified by UBTT value 304) may be determined based on an apportioned amount value (e.g., 327 or 336) and the storage capacity of physical storage device 324. For example, if the storage capacity of a physical storage device is I TB and the apportioned amount for the drive is 400 GB, then the UBTT for the physical storage device may=1 TB−400 GB=600 GB (i.e., 60% of capacity). The UBTT for a physical storage device may be determined by the management component 322 of a storage system and communicated to device controller 302, for example, based on information available in physical storage device table 330. In some embodiments, the device controller 302 may determine the UBTT based on an apportioned amount value received from the management component. The device controller 302 may store the determined UBTT as UBBT value 304 and apply it to physical storage device 324.

In some cases, the determined UBTT is lower than the VBTT. A lower background task threshold causes the physical storage device to enter into background task mode earlier, which means that background tasks like garbage collection and write leveling may be performed more frequently. As a result, more physical storage devices may have more capacity available for spontaneous de-staging, which may result in a greater likelihood of more physical storage devices qualifying for designation (e.g., as determined in step 412). Further, because background tasks are performed more frequently, there is less storage space and data on which to perform the backgrounds tasks, which may result in the background tasks being performed faster. That is, even though a lower background task threshold may result in entering background task mode more frequently, this greater frequency may be offset by each background task mode lasting a shorter amount of time.

In some embodiments, if a value calculated for a UBTT is lower than a VBTT, the UBTT value is set to the VBTT value, to avoid reserving less space for performing background tasks than the vendor has reserved.

If it is determined in step 414 that the physical storage device management for spontaneous de-staging is not enabled, i.e., that such functionality is turned off, then the VBTT for each physical storage device may be applied in step 415, for example, by device controller 302. For example, the SDS management control switch value 328 (e.g., "off") may be communicated from management component 322 to device controller 302, which may update its threshold control switch 307 accordingly and apply VBTT value 306 instead of UBTT 304. At a later time, the SDS management control switch value 328 may be set to "on," and communicated from management component 322 to device controller 302 (e.g., as part of performance of step 416), which then may update its threshold control switch 307 accordingly and apply UBTT value 304 instead of VBTT 306.

It may be desirable to turn off physical storage device management for spontaneous de-staging, for example, during peak workload hours, to prevent physical storage devices from entering into background task mode more frequently during certain times, which may degrade performance. In such embodiments, users (e.g., system administrators) are afforded the flexibility of deciding when to manage physical storage devices for spontaneous de-staging.

In some embodiments of the invention, when a power failure is detected, prior to commencing spontaneous de-staging of the cache, or immediately following the commencement, the background task mode of one or more physical storage devices may be disabled, or the UBTT and VBTT of the one or more physical storage devices may be disabled or set to a maximum storage capacity of the physical storage device so that it never enters into background task mode. The disabling of a background task mode and/or UBTT and VBTT, or setting UBTT and VBTT to a maximum storage capacity of a physical storage device, may be maintained until the spontaneous de-staging is complete or until the storage system is fully restored. Preventing a physical storage device from entering into background task mode during spontaneous de-staging using one of the foregoing techniques may prevent the spontaneous de-staging from failing to de-stage all data (or all dirty data) from the cache because of the loss of one or more physical storage devices because they enter into background task mode during the spontaneous de-staging.

It should be appreciated that, while the steps of method 400 are illustrated in FIG. 4 as being performed serially in a certain order, the invention is not so limited. One or more of the steps or portions thereof may be performed concurrently with other steps or portions thereof, or in orders other than those illustrated in FIG. 4, and may be performed in response to events (e.g., user input, interrupts, reception of data from another component, etc.) that do not occur at a set point in the sequence illustrated in FIG. 4. For example, information concerning eligible physical storage devices may be received and/or gathered at any time during performance of method 400, and the current state of that information used in step 412 to select physical storage devices to participate in spontaneous de-staging. Further, after performance of step 416, method 400 may return to step 404 as opposed to step 402, which may be returned to only in an event that an eligibility of a physical storage device has changed; and any of steps 402-412 may be in the process of being performed as part of a next iteration while step 416 is being performed on or more selected physical storage devices.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 400, or parts thereof, may be implemented using one or more of the systems and/or data structures described in relation to FIGS. 1-3, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a storage system including a plurality of physical storage devices and a cache for temporarily storing data corresponding to the plurality of physical storage devices, wherein each of the plurality of physical storage devices has a pre-defined threshold amount of consumed storage space before the physical storage device enters in a background task mode, a method comprising:
   determining a cumulative amount of storage space to be available on the plurality of physical storage devices in case of a spontaneous de-staging of the cache;
   estimating an amount of time available to spontaneously de-stage the cache;
   calculating a number of physical storage devices necessary to de-stage the cache based on the estimated amount of time available;
   selecting, based on the calculated number of physical storage devices necessary to de-stage the cache, one or more of the plurality of physical storage devices to receive de-staged data from the cache in case of a spontaneous de-staging of the cache;
   for the one or more of the plurality of physical storage devices, determining an apportioned amount of the cumulative amount for the respective physical storage device to have available for storing data in case of a spontaneous de-staging of the cache;
   for each of the one or more physical storage devices, determining a threshold amount of storage space to be consumed on the physical storage space before the physical storage device enters into a background task mode, the threshold amount based at least in part on the respective determined apportioned amount for the physical device, wherein, for at least a first of the one or more physical storage devices, the determined threshold amount is different than the pre-defined threshold amount for the at least first storage device; and
   controlling the at least first physical storage devices to consume the determined threshold amount before entering into the background task mode.

2. The method of claim 1, further comprising:
   wherein, for each of the one or more physical storage devices, the apportioned amount is determined at least in part based on a total number of the one or more physical storage devices.

3. The method of claim 1, wherein, for each of the one or more physical storage devices, the apportioned amount is determined based at least in part on a predetermined amount of time for all of the data in the cache to be de-staged during a spontaneous de-staging of the cache.

4. The method of claim 1, wherein the determined cumulative amount is based on a current amount of data stored in the cache that has changed since a last de-staging of the cache.

5. The method of claim 1, further comprising:
   each of one or more of the plurality of physical storage devices indicating, on one or more occasions, a remaining storage capacity on the physical storage device before the threshold amount of storage space is reached for the physical storage device.

6. The method of claim 1, further comprising:
   providing a parameter that specifies whether to control the threshold amount in relation to a spontaneous de-staging of the cache;
   receiving a value for the parameter indicating to not control the threshold amount; and
   for each of the one or more physical storage devices, refraining from controlling the threshold amount based on the value of the parameter.

7. The method of claim 1, wherein the steps of determining the cumulative amount of storage space, determining the apportioned amount of the cumulative amount for each respective physical storage device, and controlling the threshold amount of storage space for each respective physical storage device are repeated a plurality of times.

8. A data storage system comprising:
   a plurality of physical storage devices, wherein each of the plurality of physical storage devices has a pre-defined threshold amount of consumed storage space before the physical storage device enters in a background task mode;
   a cache for temporarily storing data corresponding to the plurality of physical storage devices;
   one or more processors; and
   a memory comprising code stored thereon that, when executed, performs a method comprising:
     determining a cumulative amount of storage space to be available on the plurality of physical storage devices in case of a spontaneous de-staging of the cache;
     estimating an amount of time available to spontaneously de-stage the cache;
     calculating a number of physical storage devices necessary to de-stage the cache based on the estimated amount of time available;
     selecting, based on the calculated number of physical storage devices necessary to de-stage the cache, one or more of the plurality of physical storage devices to receive de-staged data from the cache in case of a spontaneous de-staging of the cache;
     for the one or more of the plurality of physical storage devices, determining an apportioned amount of the cumulative amount for the respective physical storage device to have available for storing data in case of a spontaneous de-staging of the cache;
     for each of the one or more physical storage devices, determining a threshold amount of storage space to be consumed on the physical storage space before the physical storage device enters into a background task mode, the threshold amount based at least in part on the respective determined apportioned amount for the physical device, wherein, for at least a first of the one or more physical storage devices, the determined threshold amount is different than the pre-defined threshold amount for the at least first storage device; and
     controlling the at least first physical storage devices to consume the determined threshold amount before entering into the background task mode.

9. The system of claim 8,
   wherein, for each of the one or more physical storage devices, the apportioned amount is determined at least in part based a total number of the one or more physical storage devices.

10. The system of claim 8, wherein, for each of the one or more physical storage devices, the apportioned amount is determined based at least in part on a predetermined amount of time for all of the data in the cache to be de-staged during a spontaneous de-staging of the cache.

11. The system of claim 8, wherein the determined cumulative amount is based on a current amount of data stored in the cache that has changed since a last de-staging of the cache.

12. The system of claim 8, the method further comprising:
   each of one or more of the plurality of physical storage devices indicating, on one or more occasions, a remaining storage capacity on the physical storage device before the threshold amount of storage space is reached for the physical storage device.

13. The system of claim 8, method further comprising:
providing a parameter that specifies whether to control the threshold amount in relation to a spontaneous de-staging of the cache;
receiving a value for the parameter indicating to not control the threshold amount; and
for each of the one or more physical storage devices, refraining from controlling the threshold amount based on the value of the parameter.

14. The system of claim 8, wherein the steps of determining the cumulative amount of storage space, determining the apportioned amount of the cumulative amount for each respective physical storage device, and controlling the threshold amount of storage space for each respective physical storage device are repeated a plurality of times.

15. One or more non-transitory computer-readable media having software stored thereon for a storage system including a plurality of physical storage devices and a cache for temporarily storing data corresponding to the plurality of physical storage devices, wherein each of the plurality of physical storage devices has a pre-defined threshold amount of consumed storage space before the physical storage device enters in a background task mode, the software comprising:
executable code that determines a cumulative amount of storage space to be available on the plurality of physical storage devices in case of a spontaneous de-staging of the cache;
executable code that estimates an amount of time available to spontaneously de-stage the cache;
executable code that calculates a number of physical storage devices necessary to de-stage the cache based on the estimated amount of time available;
executable code that selects, based on the calculated number of physical storage devices necessary to de-stage the cache, one or more of the plurality of physical storage devices to receive de-staged data from the cache in case of a spontaneous de-staging of the cache;
executable code that, for the one or more of the plurality of physical storage devices, determines an apportioned amount of the cumulative amount for the respective physical storage device to have available for storing data in case of a spontaneous de-staging of the cache;
executable code that, for each of the one or more physical storage devices, determines a threshold amount of storage space to be consumed on the physical storage space before the physical storage device enters into a background task mode, the threshold amount based at least in part on the respective determined apportioned amount for the physical device, wherein, for at least a first of the one or more physical storage devices, the determined threshold amount is different than the pre-defined threshold amount for the at least first storage device; and
executable code that controls the at least first physical storage devices to consume the determined threshold amount before entering into the background task mode.

16. The one or more non-transitory computer-readable media of claim 15,
wherein, for each of the one or more physical storage devices, the apportioned amount is determined at least in part based on a total number of the one or more physical storage devices.

17. The one or more non-transitory computer-readable media of claim 15, wherein, for each of the one or more physical storage devices, the apportioned amount is determined based at least in part on a predetermined amount of time for all of the data in the cache to be de-staged during a spontaneous de-staging of the cache.

18. The one or more non-transitory computer-readable media of claim 15, wherein the determined cumulative amount is based on a current amount of data stored in the cache that has changed since a last de-staging of the cache.

19. The one or more non-transitory computer-readable media of claim 15, the software further comprising:
executable code controlling each of one or more of the plurality of physical storage devices to indicate, on one or more occasions, a remaining storage capacity on the physical storage device before the threshold amount of storage space is reached for the physical storage device.

20. The one or more non-transitory computer-readable media of claim 15, the software further comprising:
executable code that provides a parameter that specifies whether to control the threshold amount in relation to a spontaneous de-staging of the cache;
executable code that receives a value for the parameter indicating to not control the threshold amount; and
executable code that, for each of the one or more physical storage devices, refrains from controlling the threshold amount based on the value of the parameter.

* * * * *